L. ADAMS.
Attaching Hubs to Axles.

No. 87,815.

Patented March 16, 1869.

Witnesses
C. Raettig
Wm A. Morgan

Inventor
L. Adams
per Munn & Co.
Attorneys

N. PETERS, Photo-Lithographer, Washington, D. C.

LEVI ADAMS, OF AMHERST, MASSACHUSETTS.

Letters Patent No. 87,815, dated March 16, 1869.

IMPROVEMENT IN ATTACHING CARRIAGE-HUBS TO AXLES.

The Schedule referred to in these Letters Patent and making part of the same.

*To all whom it may concern:*

Be it known that I, LEVI ADAMS, of Amherst, in the county of Hampshire, and State of Massachusetts, have invented a new and useful Improvement in Attaching Carriage-Wheels; and I do hereby declare that the following is a full, clear, and exact description thereof, which will enable others skilled in the art to make and use the same, reference being had to the accompanying drawings, forming part of this specification, in which—

Similar letters of reference indicate corresponding parts.

Figure 1:
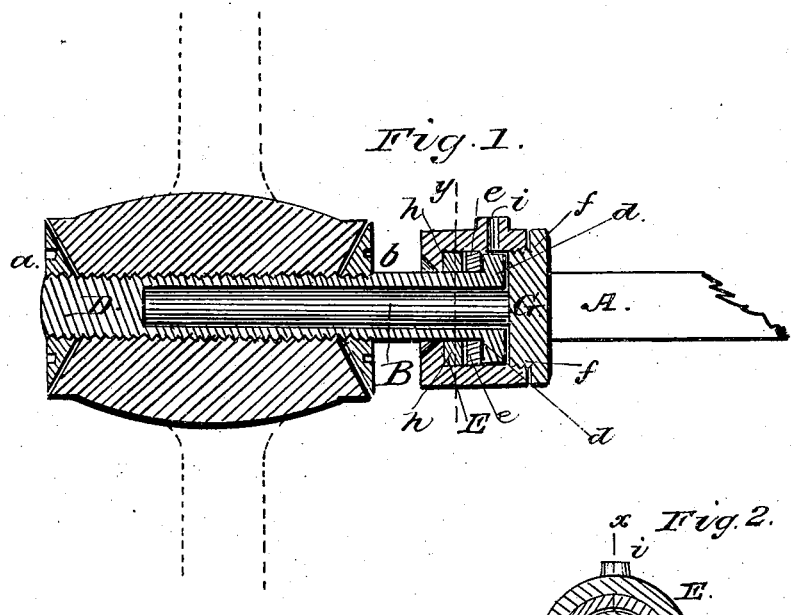
Figure 1 is a central longitudinal section through the axle and hub, as indicated by the line $x\ x$, fig. 2.
Figure 2:
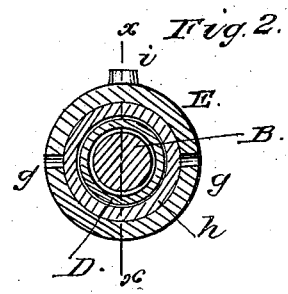
Figure 2 is a cross-section through the line $y\ y$, fig. 1.
Figure 3:
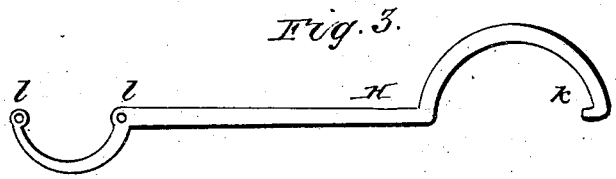
Figure 3 is a detail view of the spanner, for taking apart and putting together the several parts comprised in my invention.

The object of this invention is to provide a simple and effective means for securing wheels on their axles, and to provide a means of excluding the dust from the axle-box of vehicle-wheels.

In the drawings—

A is the axle-tree, or bar, connecting two axles, one of which is shown at B.

C is the hub.

D is the axle-box, which is formed with an external thread, as shown, for screwing into the hole in the hub, whereby the box is more firmly held in the hub.

$a\ b$ are bevelled washers or nuts, formed with threaded eyes, so as to work on the external thread of the box, as shown.

The bevelled faces of these nuts are let into the ends of the hub, so as to bring their external faces flush with the end of the hub. The hub is thus held securely in the box.

The bore of the box does not extend clear through, but terminates within a short distance of the outer end, as shown, thus leaving the box solid at the end, whereby the dust is totally excluded in that direction.

The inner end of the box is formed with a collar, or flange, $d$, which works against the collar G of the axle.

E is a hollow nut, which is fitted to screw tight to the collar G, as shown at $f$.

The axle-box D passes through this nut, and is packed with an elastic packing-ring, $h$, of rubber, or other suitable material, which is held in place against the end of the hollow nut by a metal ring, $e$, fitting loosely on the axle-box, but fitting tightly in the hollow nut, so that it shall keep its place by friction, and thus hold the packing compressed to close the joint, whereby the dust will be excluded, and the lubricating-oil supplied to the axle will be retained.

The hollow nut is formed with holes $g\ g$, for the insertion of the stud $k$, of the spanner H, when the nut is to be taken off or put on.

The nuts $a$ and $b$ are likewise provided with holes, for the insertion of the studs $l\ l$ on the other part of the spanner.

The hollow nut E serves the triple purpose of excluding the dust, retaining the wheel on the axle, and preventing the escape of the lubricating-oil.

$i$ is the hole for charging the box and nut with oil.

Having thus described my invention,

I claim as new, and desire to secure by Letters Patent—

1. The axle-box D, provided with a flange, $d$, and secured on the axle B, in connection with the collar $e$ and packing-ring $h$, by means of the hollow nut E, substantially as and for the purpose described.

2. The combination, with the hub, of the box D, arranged as described, for securing the wheel to the axle, substantially as and for the purpose specified.

3. The combination, in the running gear of vehicles, of a box, D, closed at one end, and extending beyond the hub, and provided with a collar, or flange, $d$, with the hollow nut E, axle B, and collar G, substantially as and for the purpose herein shown and described.

4. The combination, in the wheels of vehicles, of the threaded box D, and nuts or washers $a$ and $b$, let into the hub C, substantially as and for the purpose herein shown and described.

5. The combination of the elastic packing-ring $h$ and metal ring $e$, with the hollow nut E, box D, and axle B, substantially as and for the purpose herein shown and described.

The above specification of my invention signed by me, this 28th day of November, 1868.

LEVI ADAMS.

Witnesses:
FRANK BLOCKLEY,
E. GREENE COLLINS.